(No Model.) 4 Sheets—Sheet 1.

W. SANDERS.
PHOTOGRAPHIC CAMERA.

No. 433,963. Patented Aug. 12, 1890.

Witnesses
D. W. Gardner
E. T. Miatt

Inventor
William Sanders
By his Attorney,
Edward P. Thompson

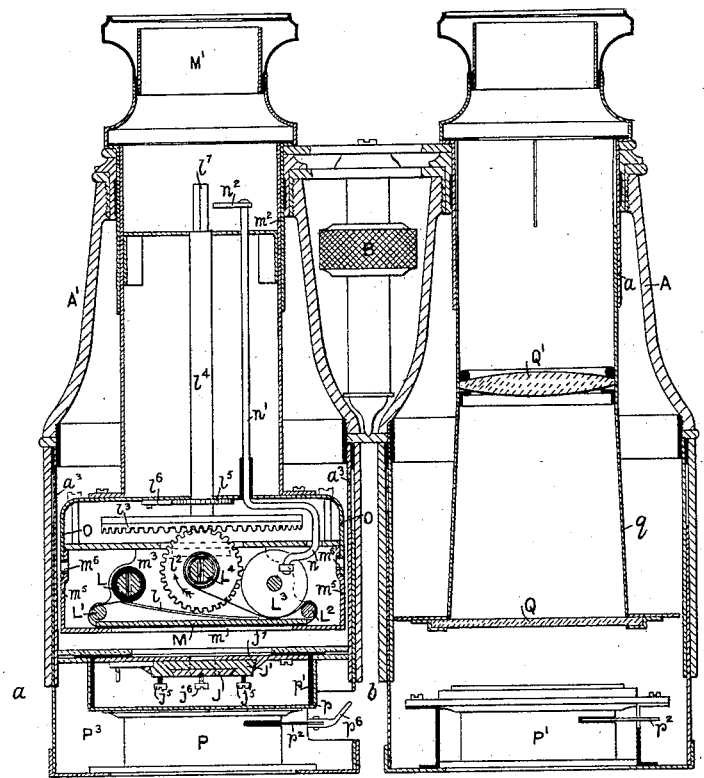

(No Model.) 4 Sheets—Sheet 3.

W. SANDERS.
PHOTOGRAPHIC CAMERA.

No. 433,963. Patented Aug. 12, 1890.

Witnesses
D. W. Gardner
G. T. Miatt

Inventor
William Sanders
By his Attorney,
Edward P. Thompson.

THE NORRIS PETERS CO., PHOTO-LITHO., WASHINGTON, D. C.

(No Model.) 4 Sheets—Sheet 4.

W. SANDERS.
PHOTOGRAPHIC CAMERA.

No. 433,963. Patented Aug. 12, 1890.

Witnesses
D. W. Gardner
G. T. Miall

Inventor
William Sanders
By his Attorney
Edward P. Thompson.

UNITED STATES PATENT OFFICE.

WILLIAM SANDERS, OF LIVERPOOL, ENGLAND.

PHOTOGRAPHIC CAMERA.

SPECIFICATION forming part of Letters Patent No. 433,963, dated August 12, 1890.

Application filed August 19, 1889. Serial No. 321,215. (No model.) Patented in England May 20, 1889, No. 8,378.

*To all whom it may concern:*

Be it known that I, WILLIAM SANDERS, boot-manufacturer, a subject of the Queen of Great Britain, residing at Liverpool, in the county of Lancaster, in the Kingdom of England, have invented certain new and useful Improvements in Photographic Cameras, (for which application has been made for a patent in England, No. 8,378, dated May 20, 1889,) of which the following is a specification.

The invention has for its object a photographic camera formed with two parallel tubes similar to the tubes of a binocular and either with or without the external appearance of the same. It is applicable for the use of detectives, and, owing to its external appearance, can be directed toward a scene or object for the purpose of producing a photographic picture thereof without suspicion being aroused as regards the real purpose which the operator has in view. The apparatus, being of very compact form and easily portable, is also applicable for tourists, surveyors, civil engineers, and others. In the examples I am about to describe a pair of telescopic tubes having parallel and simultaneous adjustment are employed, as in an opera or other like binocular glass, one of which is adapted for focusing and the other for receiving the sensitized surface or plate which is exposed to the actinic action of light. The apparatus is so arranged that when an object is focused by the one tube the sensitized surface in the other tube is in the proper focus to receive the image of such object. In the examples illustrated on Sheets I to III, inclusive, of the accompanying drawings certain portions of an opera-glass or the like are utilized, so as to avoid having to make new patterns, models, &c., or else their shape or contour is closely copied. In Sheet IV a camera is shown, all the parts of which are made specially for the purpose, and have an external appearance somewhat resembling an opera-glass.

Figure 1:
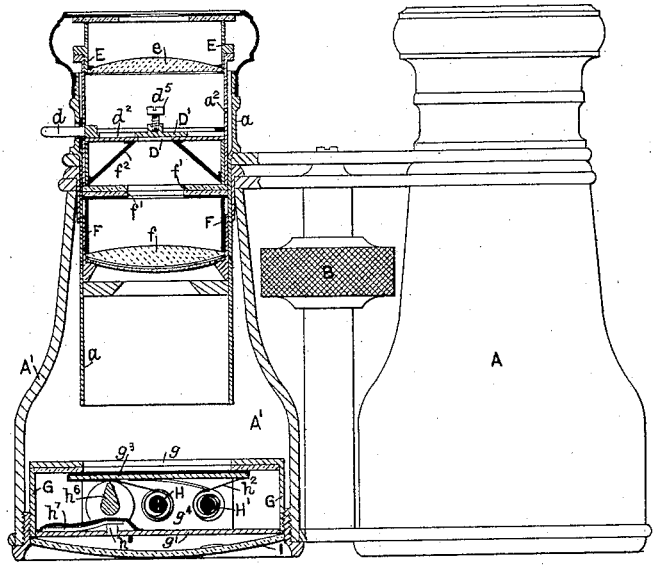
Figure 2:
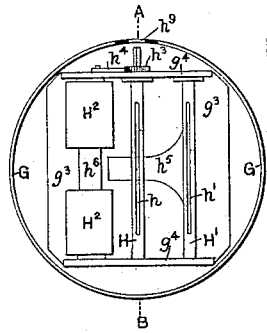
Figure 5:
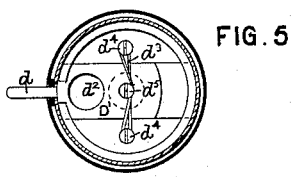
Figures 3, 4:
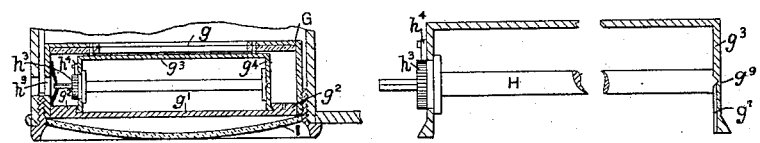

Referring to Sheet I, Figure 1 is an elevation of a photographic camera applicable for taking paper negatives, in which a tube $a$, sliding telescopically within a tube A, is employed for focusing, and is provided with lenses similar to those used in opera-glasses, the apparatus being reversed after focusing, so that the smaller end is directed toward the object when it is desired to admit a ray of light from the object to the sensitized surface in the interior; Fig. 2, a plan of the lower part of tube A', Fig. 1, showing the device for carrying the sensitized paper; Fig. 3, a cross-section on line A B, Fig. 2; Fig. 4, an enlarged section of the paper-carrying spindle and frame, showing the means employed for detaching the former; Fig. 5, a plan of the shutter.

Figure 12:
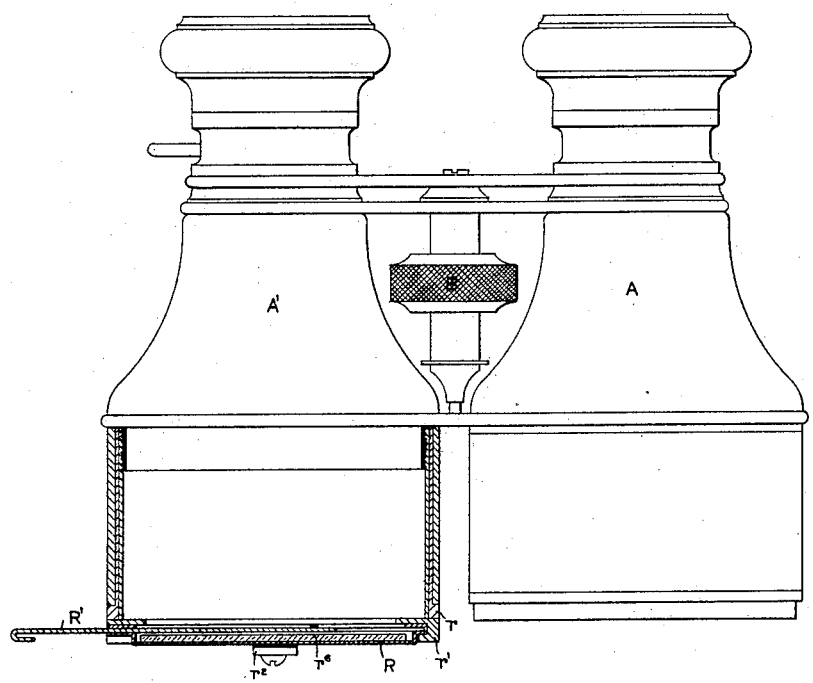
Figure 13:
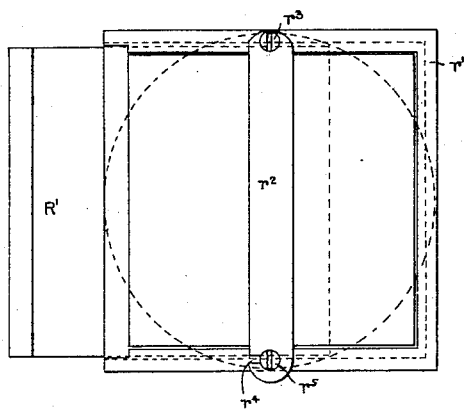
Figure 14:
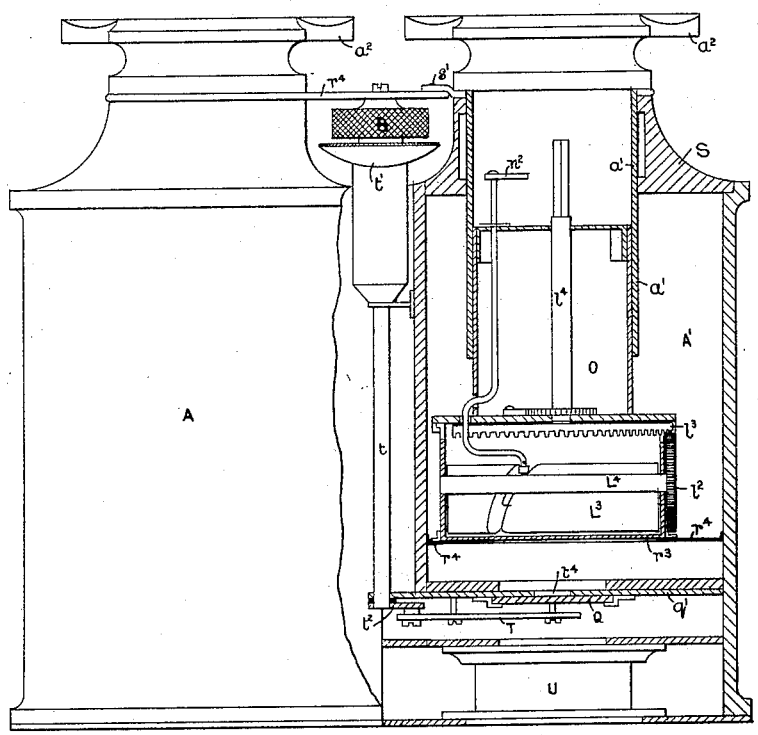
Figure 16:
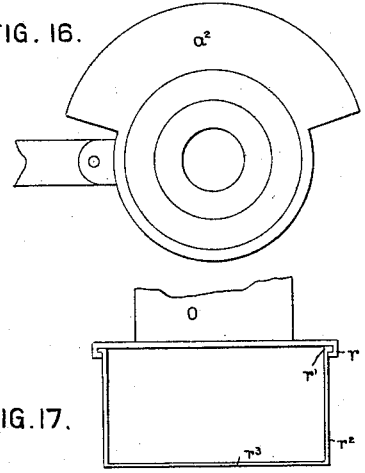
Figure 15:
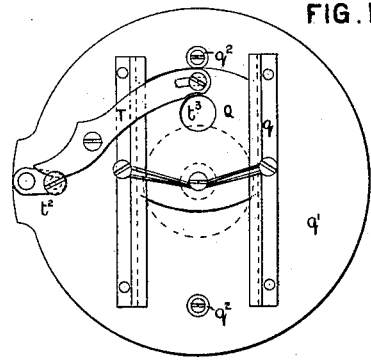
Figure 17:
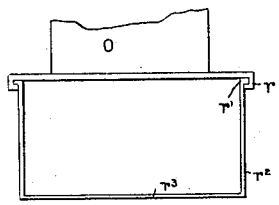

In Sheet II, Fig. 6 is a sectional elevation of a photographic camera which is not reversed after focusing, as in the previous example, but can be directed toward the object focused and the photographic negative produced without removing it from the eyes; Fig. 7, a section on line $a\,b$, Fig. 6, showing the exposing-shutter in plan; Fig. 8, a section on the line C D, Fig. 7; Fig. 9, an elevation, partly in section, of a portion of the tubular frame shown in section on Fig. 6, showing the means employed for attaching the sensitized paper-roll frame and the cover to the tubular frame aforesaid, the plane of section of this figure being at right angles to that of Fig. 6; Fig. 10, a plan of the paper rolls, cam-grooved roller, &c., shown in end elevation in Fig. 6; Fig. 11, a plan of the lens-holder P and P', in which is mounted the lenses, having a diaphragm $p^2$ interposed between them, and applicable for regulating the quantity of light passing through the lens or for closing the lens altogether. Fig. 12 of Sheet III is an elevation, partly in section, of a camera in which photographic pictures are produced upon glass instead of paper, and which is reversed after focusing to obtain the photographic image. Fig. 13 is an inverted plan of a portion of Fig. 12, showing the dark-slide or plate-holder. Fig. 14 of Sheet IV is an elevation, partly in section, of a camera, all the parts of which are made specially for the purpose, and to bear some resemblance to an opera-glass or the like. The apparatus is adapted for producing paper negatives. Fig. 15 is a plan of the exposing-shutter shown in section in the preceding figure; Fig. 16, a front elevation of the eye-piece or eye-rest; Fig. 17, a sectional elevation of a portion of the paper-roll frame and the means of attaching it to the tubular frame O, Fig. 14.

Referring, first, to Figs. 1 to 5, inclusive, A A' are the telescopic tubes of the apparatus, which can be adjusted simultaneously to the same focus by the milled headed screw B. The telescopic tube A is preferably constructed in the usual manner of opera or field glasses, and is provided with the usual lenses forming the eye and object glasses. The other telescopic tube A' forms the chamber in which the sensitized paper is exposed. It comprises a tube $a$, capable of being slid back and forth telescopically in the tube A' simultaneously with the focusing-tube A when the milled head B is turned, so as to regulate the distance of the sensitized paper from the lenses. Within the tube $a$ is socketed the tubular piece $a^2$, containing an opening D, covered by a shutter D'. A rubber or other suitable spring $d^3$, looped at each end over the pins $d^4$ and in the middle over the pin $d^5$, (see Fig. 5,) keeps the shutter over the hole and prevents the passage of light. By pressing the projecting pin $d$ the shutter is pushed toward the other side, thus bringing a hole $d^2$ in the shutter in correspondence with hole D, so as to admit a ray of light from the object to the sensitized surface in the interior. When the pressure on the projecting pin $d$ is released, the shutter flies back, covers the hole D, and shuts off the light. The nipple E, Fig. 1, which is screwed or socketed to the tube $a^2$, carries the lens $e$. The lens-holder F, which receives the lens $f$, is screwed or socketed in the tube $a$, and abuts against the black cloth washer $f'$, bearing upon the face of the diaphragm $f^2$. The respective lenses are so ground or adjusted that when an object is focused by the tube A the sensitized surface in the tube A' is in the proper focus to receive the image of such object.

G is a circular case, Figs. 1, 2, and 3, having a square or other shaped opening $g$ at one end. The other end is closed by a plate $g'$, which is adapted to receive and hold by means of cheeks $g^2$ on its inner face the downwardly-projecting flanges $g^4$ of the paper-roll frame $g^3$.

H H' are rollers capable of rotation in the downwardly-projecting flange of the frame $g^3$. They are each provided with longitudinal slots $h\ h'$, adapted to receive the ends of the sensitized paper, so that the latter will rotate with and be fed onto or off the rollers aforesaid. The grooves $g^7$ in the arm $g^3$ enable the rollers H H' to be removed by forcibly pressing outward the arm aforesaid. At the top or upper end of the grooves $g^7$ are countersinks for the support of the rollers H H'. In Fig. 4 one of these countersinks is shown at the right-hand end of the roller H, and is lettered $g^9$.

The sensitized paper $h^2$, or other suitable flexible material, is laid on the outer flat face of the frame $g^3$, so that its sensitized surface will be exposed by the opening $g$ to the action of the light when the shutter D' is opened. The paper is passed beneath the roller $H^2$, and the opposite ends are inserted through the slots $h\ h'$ aforesaid. It is then rolled round the paper-roll H' and drawn tight, so as to present a smooth flat surface beneath the aperture $g$. A ratchet-wheel $h^3$ on the end of the roller H, a pawl $h^4$, engaging the teeth thereof, and a spring riveted to the frame $g^3$, exerting a pressure on the paper roll H', retain the paper drawn tight. The shank of the roller H is adapted to receive a key by which it can be rotated, and a hole $h^9$ is provided in the side, by which the key can be introduced. The spindle of the roller $H^2$ is provided with a tooth $h^6$, which in its rotation periodically strikes the spring $h^7$ and momentarily thrusts the stud $h^8$ through a hole in the plate $g'$. The circumference of the roller $H^2$ is approximately equivalent to the length of the opening $g$, so that the stud $h^8$ is momentarily thrust out when a length of sensitized paper equivalent to the length of the opening $g$ has been rolled onto the paper roll.

I is an ordinary watch-glass or the like, which is provided, mainly, to give the apparatus the appearance of an opera-glass. The movement of the stud aforesaid can be observed by the operator through the glass I.

The mode of action is as follows: The operator directs the apparatus toward the object and focuses the telescopic tube A by the milled head B until distinct vision is obtained. The telescopic tube A' is thereby simultaneously adjusted to the same focus. The apparatus is now reversed and the small end directed toward the object of which a photographic picture is desired. The projection $d$ is depressed, uncovering the hole in the shutter D' and admitting a ray of light from the object to the sensitized paper $h^2$. When the exposure is completed and the picture of the object produced, the roller H is rotated by a key inserted through a hole $h^9$ in the side of the apparatus, thereby rolling the sensitized paper onto the paper roll H from the roll H' and presenting a fresh surface beneath the opening $g$ ready for the next exposure. The circumference of the roller $H^2$ being approximately equivalent to the length of opening $g$ and the stud $h^8$ being momentarily thrust beyond the face of the plate $g'$ once in each revolution of $H^2$, it follows that the movement of the stud aforesaid (which can be observed through the glass I) indicates when a fresh surface of sensitized paper is presented ready for the next exposure. In this way photographic pictures are successively produced and rolled onto the paper-roll H. They can afterward be removed from the apparatus in a dark-room and treated in the ordinary manner.

The camera (illustrated in Figs. 6 to 11, inclusive) is provided with a ground-glass screen and magnifying-glass for focusing, on which an image of the visible objects falls. The camera is not in this arrangement reversed to take a photographic picture, but is directed toward the object focused, and the sensitized surface exposed without reversing the instrument. The dark-shutter J, Figs. 6, 7, and 8, which has a hole or opening $j$, is mounted and is capable of sliding back and forth on the face of a second shutter J', which is itself capable of sliding back and forth in the same directions as the first one. Side cheeks are provided, so that the shutter aforesaid shall move in parallel lines. Shutter J is coupled to shutter J' by an elastic rubber band or spring $j^4$, passed round or looped to the studs $j^6$ on the former and studs $j^5$ on the latter. The said coupling-spring $j^4$ enables both shutters to move synchronously (except when the lower shutter J' is engaged by the tooth K, hereinafter described, when the other one alone can move) and retains the opening $j$ in communication with the opening $j^2$. The tooth or catch K is caused to engage a depression in the slide J' by means of the spring $k$ and prevents it being shifted so long as the tooth is in engagement. By depressing the finger $k^2$ the shutter J is moved on the face of the lower shutter J', and the opening $j$ in the former is placed in connection with opening $j'$ and admits a ray of light through the hole in the base-plate $j^7$ to the interior of the camera. When pressure is removed from the finger aforesaid, the shutter J slides back to its original position by virtue of the elasticity of spring $j^4$, thus closing the opening $j'$.

To admit a ray of light momentarily to the interior, the camera is turned round, so that the finger $k^2$ points upward instead of downward, as shown in Fig. 7. The stud $k^3$ is depressed, thus releasing the tooth K from engagement, and the shutters J and J' drop simultaneously by gravity, admitting for an instant of time as they pass the opening $j^8$ a ray of light to the surface of the sensitized paper in the interior. The tooth K now engages the other depression in the shutter J', and the finger $k^4$ projects from the camera instead of the finger $k^2$. The operation can be repeated in a similar way, the apparatus being turned round, as before, so that the slides shall drop by gravity when released from the engagement of the tooth K.

The lenses are mounted in the holder or frame P, Figs. 6 and 11, whose flange $p$ receives the flange $p'$. Between the two lenses is a shutter $p^2$, which is rotatable on an axis $p^3$ and is adapted to shut off the light altogether or admit a beam or pencil of light. Openings $p^4$ and $p^5$, of different diameters, are provided in the shutters aforesaid. By rotating the shutter $p^2$ by the handle $p^6$ one of the openings aforesaid may be placed in communication with the lens, so as to admit a beam of light, or the light may be shut off altogether by placing the shutter in the position illustrated on Fig. 11. A similar frame or holder P', with lenses and shutter, is mounted in the focusing-tube A. The sensitized paper is carried on a roll L, and is retained in position by a spring $l$, so as not to unroll accidentally. The paper is then passed round the guide-roller L', along the flat surface or face of the paper-roll frame M, round the guide-roller $L^2$, and beneath the cam-grooved roller $L^3$ to the paper-roll $L^4$. The roll $L^4$ is provided with a pinion $l^2$, which engages a circular rack $l^3$ on a spindle $l^4$. The said spindle is mounted in suitable bearings and is provided with a ratchet-wheel $l^5$ and pawl $l^6$, so that the rack aforesaid can only be rotated in one direction.

To present a fresh unexposed surface of paper to the lens, the spindle and rack are rotated by a key or its equivalent inserted through the eye-piece M' onto the square shank $l^7$ of the spindle, thereby rotating the pinion $l^2$ in the direction of the arrow, Fig. 6. The paper is rolled onto the roll $L^4$ and unrolled from the paper-roll L, and rotation is continued until an unexposed surface of paper is presented ready for exposure at the opening $m$. The paper is retained flat and taut at the opening $m$ by the retaining-spring $l$, the ratchet-wheel $l^5$, and pawl $l^6$. The movement of the sensitized paper rotates the roller $L^3$, whose circumference is approximately equal to the length of the opening $m$. The said roller is provided with a cam-groove $l^8$, Fig. 10, which receives an arm or crank $n$ of a rotatable spindle $n'$. At the other extremity of the said spindle and in proximity to the eye-piece M', so that it can easily be seen by the operator, is an arm or index-pointer $n^2$. When the spindle $l^4$ is rotated, the index-hand is also moved in the arc of a circle by virtue of the engagement of the arm $n$ with the cam-groove $l^8$ in the roller $L^3$, and by reaching a given point in the said arc warns the operator to cease rotating the spindle $l^4$, because the part of the paper which had already been exposed has been moved away from and a fresh unexposed part presented to the opening $m$.

The tubular frame O (carrying the spindles $l^4$ and $n'$, the paper-roll frame M, &c.) is socketed to the tube $m^2$, which can be moved telescopically in the tube A' by the milled head B, so as to adjust the focal length of the instrument. The aforesaid frame O is provided with springy projecting side feet $o$, Fig. 9, which receive the upwardly-projecting sides $m^3$ of the paper-roll frame M. One of said sides $m^3$ is provided with a projecting pin $m^4$, which engages a hole in one of the feet $o$. The other side of the frame is retained in position by friction; but, owing to the springy nature of the side feet aforesaid, the frame M can easily be removed, when desired, so as to take out the photographic pictures or replenish the rolls with paper.

In Fig. 9 the rollers L, $L^3$, and $L^4$, &c., are not shown, in order that the mode of construction shall not be obscured. The tubular frame aforesaid receives a cover $m^5$, so made that no light can penetrate to the sensitized paper, except that which is exposed (when the shutters are opened) by the opening $m$. The cover is secured by bayonet-joints $m^6$, so that it is easily removable. Between the cover and the flat face of the paper-roll frame M is sufficient space for the sensitized paper.

Q is a ground-glass screen mounted at the end of the tube $q$, which is socketed in the tube $a$. The latter can be moved telescopically in the tube A, so as to adjust the focal length of the ground-glass screen Q from the lenses mounted in the lens-holder P.

Q′ is a lens mounted in a suitable position in the tube $q$, and enables the operator to see the image on the ground-glass screen Q.

The mode of operation of the apparatus illustrated in Figs. 6 to 11 is as follows: The apparatus is directed toward the object in the ordinary manner of opera-glasses, and the desired photographic field is obtained by adjusting the diaphragm-shutter $p^2$ in the lens-holder P, and the field of vision by adjusting the shutter $p^2$ in the lens-holder P′. The milled head B can now be rotated to adjust the apparatus to the proper focus until a distinct image of the object is seen on the ground glass Q by aid of the magnifying-screen Q′. The distance of the tubular frame O (carrying the sensitized paper) from the lenses is adjusted simultaneously with the ground-glass screen Q. A surface of sensitized paper having been presented to the opening $m$ in the manner hereinbefore described, the shutter J is operated and the paper is exposed for any desired period of time to the actinic action of the light. If it is desired to expose instantaneously the sensitized paper, the shutters J and J′ are operated as previously herein set forth. The paper bearing on its face the photographic image is then moved away from the opening $m$ by rotating the spindle $l^4$, and a fresh unexposed surface of paper takes its place. When the operator has completed his work or the supply of sensitized paper on the roll L is exhausted, the apparatus may be removed to the dark-room, where the lens-holder P and the frame $P^3$, carrying the shutters aforesaid, can be removed from the tube $a^3$. The removal of these parts enables the tubular frame O to be taken out. This is, however, facilitated by first unscrewing the said tubular piece $a^3$, on which the sun-shade (usually provided in opera-glasses) slides. The cover $m^5$ is now disengaged and taken off, and the paper roll frame M can be forcibly removed by virtue of the springy nature of the side feet $o$. The photographic negatives can then be unrolled and the paper rolls replenished with a fresh supply of sensitized paper.

Figs. 12 and 13 illustrate another example of an opera-glass adapted to serve as a camera, in which a plate of glass is employed instead of paper, as in the previous examples. In these figures, R is a dark-slide or plate-holder, which is secured to the end face of one of the tubes. The tubular piece $r$ is made square on its end face, and is provided with beveled or rabbeted side and end cheeks $r'$. These receive the dark-slide or plate-holder R, which may be held in position by the springy or elastic bar $r^2$, pivoted at $r^3$ to the side cheek aforesaid. The slot $r^4$ in the other end can be caused to engage the pin $r^5$ on the opposite cheek $r'$ and hold the dark-slide in position by virtue of its elasticity. R′ is the shutter, which can be opened to expose the sensitized plate $r^6$ or closed to keep the said plate in darkness.

The operation is as follows: The apparatus is directed toward the object, and both tubes A and A′ are simultaneously focused by the milled head B. The sensitized plate $r^6$ can now be exposed by drawing out the shutter R′. If desired, a shutter may be provided similar to that described in the preceding example. When the exposure is completed, the springy bar $r^2$ can be released, and the dark-slide can then be removed and replaced by another one containing a fresh unexposed plate.

Figs. 14 to 17, inclusive, illustrate a photographic camera constructed so as to resemble in external appearance an opera or field glass. In these the tubes $a$ $a'$ can be simultaneously adjusted telescopically within the tubes A A′ to the proper focus by rotating the milled head B. The eye-pieces, which are preferably made in one piece with the tubes $a$ and $a'$, are provided with a semicircular projection $a^2$, Figs. 14 and 16, adapted to rest against the eyebrows of the operator when he directs the apparatus toward the object, and they form rests to enable him to hold the instrument motionless while adjusting the focus or while taking a photographic picture.

The tubular frame O, Figs. 14 and 17, is provided with two parallel lips or ribs $r$, which receive the flange $r'$ on the projecting arms $r^2$ of the paper-roll frame $r^3$ and hold the frame $r^3$ in position.

$L^3$ is the cam-grooved roller for operating the pointer or needle $n^2$, and $L^4$ one of the paper-rolls. These are rotatable in the side arms $r^2$. $l^2$ is the pinion mounted on the paper-roll aforesaid, which engages the circular rack $l^3$, and $l^4$ is the spindle for operating the said parts. The construction and operation of these parts are similar to those described in reference to Figs. 6 and 10, and further description is not therefore needed. The tubular frame O is socketed in the tube $a'$, and the focal length is adjusted simultaneously with the tube $a$ by turning the milled head B. It is guided in its movement by the side projecting pieces $r^4$.

To remove the photographic negatives or replenish the rolls with a fresh supply of paper, the screw $s'$ is unscrewed and the tubes $a$ $a'$ are taken out. The cap or cover S is removed, and the tubular frame O can then be drawn out. The paper-roll frame $r^3$ is now detached from the frame O by forcibly squeezing or pressing toward each other the arms $r^2$, so as to free the flange $r'$ from the lip $r$.

The shutter Q, Figs. 14 and 15, is capable of sliding between cheeks $q$ on the face of the plate $q'$. It is limited in its travel by stops $q^2$.

T is a lever pivoted on the plate $q'$ and linked or pivoted to the shutter Q.

The spindle $t$ and milled head $t'$ rotate independently of the milled head B. The said spindle has mounted on its end a crank or arm $t^2$, to which it is firmly secured. When the said arm $t^2$ is rotated in the direction indicated by the arrow, (by turning the milled head $t'$,) it strikes in its passage the lever T, turns it on its pivot, and moves the shutter Q so that the hole $t^3$ is placed in communication with $t^4$ and admits a ray of light to the interior of the camera. When the milled head $t'$ is released, the shutter flies back by the elasticity of the spring $q^3$. If an instantaneous exposure is desired, the milled head is rapidly rotated, and the hole in the shutter Q is thereby momentarily brought into communication with hole $t^4$; but immediately the arm $t^2$ has passed the curved face of the lever T the latter is released and the shutter flies back, closing the holes and excluding the light.

U is a holder containing the lenses.

I declare that what I claim is—

1. In a photographic camera having a continuous flexible strip or belt of sensitized material, as described, the combination, with a frame $g^4$ and paper rolls H and H′, of a cam-roller H², mounted with its cylindrical periphery touching the surface of the sensitized material $h^2$ and rotated by and during the passage of such material from the roll H′ to the roll H, and a stud $h^8$, mounted on a spring-plate $h^7$, which is periodically struck by the cam-roller aforesaid and is momentarily thrust through the plate $q'$ in full view of the operator, substantially as and for the purpose described.

2. In a photographic camera, an appliance for exposing the sensitized surface or film either momentarily or for a longer period, at will, consisting in the combination of the diaphragm $j^6$ with opening $j^5$, the shutter J′, sliding on said diaphragm and provided with openings $j'$, $j^2$, and $j^3$, the sliding shutter J, provided with an opening $j$ and elastically coupled to the shutter J′ aforesaid, so as to be capable of moving synchronously therewith and of bringing for an instant of time the holes $j$ and $j^2$ in correspondence with the hole $j^5$ in the diaphragm aforesaid, the spring-catch K, adapted to engage the shutter J′ and enable the opening $j$ in shutter J to be placed in correspondence with the openings $j'$ or $j^3$ and the opening $j^8$, and means for instantaneously releasing said spring-catch, when desired, substantially as set forth.

In testimony whereof I have signed my name to this specification in the presence of two subscribing witnesses.

WILLIAM SANDERS.

Witnesses:
WM. P. THOMPSON,
GEO. C. DYMOND.